United States Patent [19]

Sohnius

[11] 4,337,012
[45] Jun. 29, 1982

[54] ANCHOR BOLT EXPANSION SHELL

[76] Inventor: Heinrich Sohnius, 6 Reitz St., Monument, Krugersdorp, Transvaal, South Africa

[21] Appl. No.: 142,867

[22] Filed: Apr. 21, 1980

[30] Foreign Application Priority Data

Apr. 25, 1979 [ZA] South Africa ..................... 79/1984

[51] Int. Cl.³ ............................................. F16B 13/08
[52] U.S. Cl. .......................................... 411/67; 411/3; 411/8
[58] Field of Search ................... 411/67, 63, 72, 71, 411/53, 52, 50, 49, 39, 42, 8, 9, 1, 2, 3; 405/259, 260

[56] References Cited

U.S. PATENT DOCUMENTS 2,787,931 4/1957 McCabe ........................... 411/67 X
2,799,201 7/1957 Genter ................................. 411/67
2,870,666 1/1959 Dempsey ............................. 411/67

Primary Examiner—Ramon S. Britts
Attorney, Agent, or Firm—Nathaniel A. Humphries

[57] ABSTRACT

This invention relates to an anchor bolt expansion unit and the bolt assembly using such a unit. The unit consists of a plurality of leaves connected together by a bail having a flat cap and fingers secured one to each leaf. The flat cap is dimpled to ensure an even distribution of tension applied to the fingers before the bail yields in use and also has a line of weakness to ensure that it will yield at a predetermined axial pressure. The fingers of the bail are also weakened at points in their length to a strength slightly greater than that resulting at the peripheral line of weakness.

6 Claims, 3 Drawing Figures

ANCHOR BOLT EXPANSION SHELL

This invention relates to anchor bolt expansion shells and the units and bolt assemblies including such shells.

Anchor bolt assemblies used extensively in underground mine workings frequently are difficult to install in soft rock conditions. This is essentially because the initial grip of leaves of the expansion shell with the wall of the hole in which the anchor bolt is to be secured is difficult to obtain. Under these conditions it is often most important that the leaves expand normal to the axis of the assembly and thus ensure maximum support from the rock in order to give an effective anchorage. If the leaves are caused to diverge during expansion this can result in breakage of the soft rock and lack of anchorage.

It is also important that the anchor bolt assemblies and bolts be made as inexpensively as possible as large numbers of the assemblies are used in mining operations each are increasing the costs of production of the mine.

One form of anchor bolt which has many practical advantages is that in which the leaves of the expansion unit are connected together by a bail which can also be used to apply an initial expansion of the unit. This advantage is often lost if the bail is not correctly designed.

The bail must be easily flexible so that it will not inhibit the desired expansion of the leaves referred to above and must resist the destruction action of the cropped end to the threaded bolt. It must also be capable of yielding suddenly when a predetermined load has been applied thereto. These requirements are in conflict and this invention is directed to obtaining a high degree of efficiency with respect to each factor rather than a compromise.

According to this invention there is provided an anchor bolt expansion unit comprising a plurality of separate leaves having arcuate and serrated outer surfaces, substantially flat inner surfaces and which taper inwardly in both width and thickness towards ends each secured to a finger of a bail of different material; the bail having a centrally dimpled flat cap member at the ends of the fingers remote from the leaves and a peripheral line of weakness formed in the cap about the dimple and on a diameter larger than that of the bolt with which the unit is to be used and a conical nut having flat surfaces provided thereon adated to engage the inner surfaces of the leaves.

Further features provide for the peripheral line of weakness to be made by cutting through the cap around the dimpled area of the cap except along certain equally spaced and equal lengths of the periphery and for the fingers of the bail to be weakened at joints in their length to a strength slightly greater than that resulting at the peripheral line of weakness.

The invention also provides for the assembly to have three leaves.

A preferred embodiment of the expansion shell and an anchor bolt assembly is shown in the accompanying drawings in which.

Figure 1:
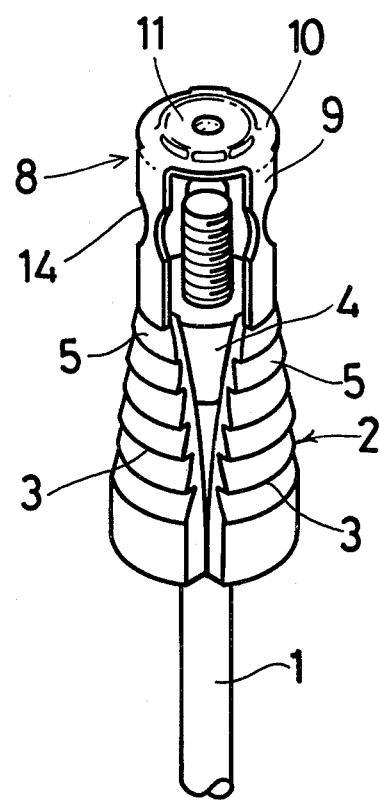
FIG. 1 is an oblique view of a complete anchor bolt assembly.

As illustrated the anchor bolt assembly consists of a rod 1 in an expansion unit consisting of a shell 2 having three equidistantly spaced leaves 3 around a plug 4. The leaves 3 taper inwardly both in width and thickness towards the ends 5 which will be the inner ends when the assembly is operatively engaged in an anchoring hole. Also the inner surfaces 6 of the leaves will preferably be flat over at least the majority of their lengths and adapted to co-operate with corresponding flats 7 formed on the outer surface of a conical plug 4. The plug 4 has a longitudinally extending screw threaded bore engaging a complementary screw thread on the end of the rod 1.

The leaves are preferably forged from material such as mild steel and the outer curved surfaces are provided with a view of serrations as shown which assist in anchoring the leaves in the well known manner. Also, as is shown the leaves have a length which is shorter than that usually encountered in anchor bolt assemblies being about one and one half the width of the leaves at this widest part. This arrangement is chosen to give the maximum expansion with a minimum material used while maintaining adequate anchorage surfaces.

The thin end 5 of each leaf 3 is connected to the free end of a finger 9 forming part of a bail 8. The bail 8 is manufactured from flat plate of a mild steel and of a thickness less than that of the thin ends of the leaves 3.

The leaves 3 are each secured, preferably by welding, to fingers 9 to extend longitudinally from the leaves 3 and have their remote ends integral with a cap 10 which is originally substantially at right angles to the fingers 9.

The cap 10 is in the form of a flat plate and has a centrally inwardly dimpled section 11, that is, with the bottom of the dimple between the fingers 9. This dimple is accurately located and engages the end of the rod 1 in a manner such that substantially equal tension is applied to each of the bail fingers 9.

The dimple ensures that the periphery of the end of the rod 1 does not contact the cap 10. This has been found to give two desired effects. The first and most important is that the sharp edge of the cropped rod cannot cut into the cap 10 and pass therethrough without applying an adequate initial expansion of the leaves 3. It also has the effect of stiffening the central area of the cap so that the area around the dimple remains flat.

Figure 2:
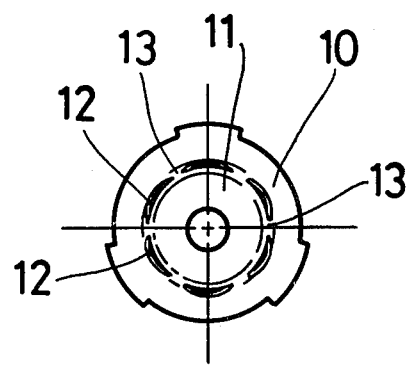
FIGS. 2 and 3 show details of the bail.

However, it is very desirable that the bail break once a predetermined tension has been applied thereto during the initial expansion of the leaves and that the break should be sudden. For this purpose a peripheral line of weakness 12 is made around this dimpled section by cutting through the cap along the circular line indicated by 12 except at certain places 13. These places 13 are preferably six in number and are of equal length and equally spaced apart. They are clearly indicated in FIGS. 2 and 3.

Figure 3:
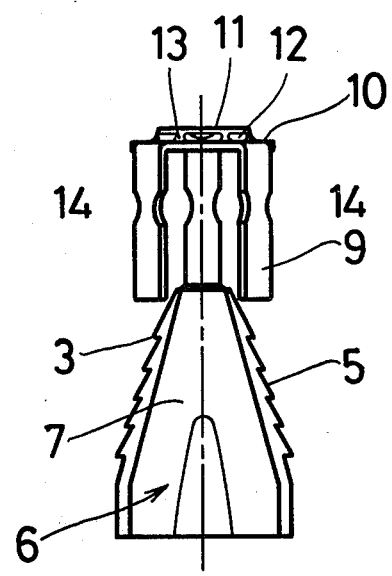

FIG. 3 also shows that the cutting operation when effected by a suitable punching die raises the dimpled section of the cap.

Even when made as set out above operating conditions of the anchor bolt sometimes occur which prevents the bail breaking as desired. To ensure that the bail does break each finger 9 has a weakened section 14 formed therein which is designed to be a little stronger than the line of weakness in the cap 10. FIG. 3 also shows how the weakened section 14 is formed in the length of each finger 9.

As set out above the purpose of the cutting of the cap and weakening of the fingers is to ensure the proper operation of the anchor bolt in soft rock conditions. Extensive experimentation has had to be conducted under these conditions by the Applicant to determine the proper strength of the bail.

Under soft rock conditions it is necessary that the expansion unit can be caused to expand without any great dependancy on frictional engagement between the outer surface of leaves 3 of the shell 2. This has been achieved by the design of the bail.

It is also important that the fingers of the bail do not extend radially beyond the outer surface of the leaves 3 and thus relatively thin material compared to the fingers is used.

When the expansion unit is inserted in the hole the rod 1 is screwed through the plug 4 to engage the dimpled section 11 of the bail cap 10. When the rod 1 engages this section 11 further axial pressure of the rod against the cap tends to force the plug 4 along the leaves 3 to expand the unit even though there is no great frictional engagement of the leaves with the wall of the hole.

This effect can be made to exist until a predetermined axial tension exists in the rod and will be obtained with varying degrees of expansion of the unit depending on the condition of the rock in which the anchor bolt assembly is used. Thereafter the bail must break to obtain final effective operation of the expansion unit with the designed tension applied to the rod 1 usually by means of a hydraulic bolt tensioner.

It has been found that the form of weakening the cap as described above has given the desired results in a very high percentage of cases. However, under very unusual conditions the cap does not separate to allow the bolt to pass therethrough at the desired designed rod tension. To allow for even this unusual contingency the fingers 9 have been weakened as illustrated. With this combination the occasions when the bail will not yield at the designed tension in the rod 1 are negligible.

The breakage or yield point of the bail can be designed to meet the worst rock conditions likely to be encountered with the use of anchor bolt assemblies and then the assemblies will be suitable for universal use. Test results have indicated that a rod tension of about 4 tonne to break the bail has proved satisfactory.

I claim:

1. An anchor bolt expansion unit comprising a plurality of separate leaves having arcuate and serrated outer surfaces and substantially flat inner surfaces which taper inwardly in both width and thickness towards ends each secured to a finger of a bail of different material; the bail having a cap member connected about its periphery to the ends of the fingers remote from the leaves, the cap member including a central dimple portion extending axially in a direction toward the leaves and a peripherial line of weakness formed in the cap about the dimple portion and being positioned on a diameter larger than that of a bolt with which the unit is to be used and a conical nut having flat surfaces provided thereon adapted to engage the inner surfaces of the leaves and being threaded on the bolt and wherein the dimple portion is shaped and dimensioned so as to engage one end of the rod solely within the outer periphery of the rod.

2. An anchor bolt expansion unit as claimed in claim 1 in which the peripheral line of weakness is made by cutting through the cap member around the dimple portion of the cap except along certain equally spaced and equal lengths of the periphery.

3. An anchor bolt expansion unit as claimed in claim 2 in which the fingers of the bail are weakened at points in their length to a strength slightly greater than that resulting at the peripheral line of weakness.

4. An anchor bolt expansion unit as claimed in claim 2 in which six uncut places are left in the line of weakness.

5. An anchor bolt expansion unit as claimed in claim 4 in which there are three equally spaced leaves co-operating with a conical plug having flat portions on the outer surfaces each co-operating with a flat inner surface of each leaf.

6. An anchor bolt expansion unit as claimed in claim 5 in which the leaves taper inwardly both in width and thickness towards the ends of the bail fingers.

* * * * *